US010363906B2

(12) United States Patent
Allan

(10) Patent No.: US 10,363,906 B2
(45) Date of Patent: Jul. 30, 2019

(54) WIPER FOR LIQUID LEVEL SENSORS IN AUTOMOTIVE WASHER BOTTLE

(71) Applicant: ABC Group Inc., Toronto (CA)

(72) Inventor: Richard Allan, Holland Landing (CA)

(73) Assignee: ABC TECHNOLOGIES INC., Toronto (CA)

( * ) Notice: Subject to any disclaimer, the term of this patent is extended or adjusted under 35 U.S.C. 154(b) by 0 days.

(21) Appl. No.: 15/745,780

(22) PCT Filed: Jul. 21, 2016

(86) PCT No.: PCT/CA2016/050857
§ 371 (c)(1),
(2) Date: Jan. 18, 2018

(87) PCT Pub. No.: WO2017/011914
PCT Pub. Date: Jan. 26, 2017

(65) Prior Publication Data
US 2018/0208158 A1    Jul. 26, 2018

Related U.S. Application Data

(60) Provisional application No. 62/195,064, filed on Jul. 21, 2015.

(51) Int. Cl.
*B60S 1/62* (2006.01)
*B60S 1/50* (2006.01)
*G01F 23/26* (2006.01)

(52) U.S. Cl.
CPC . *B60S 1/62* (2013.01); *B60S 1/50* (2013.01); *G01F 23/265* (2013.01); *G01F 23/268* (2013.01)

(58) Field of Classification Search
CPC .................................... B60S 1/50; B60S 1/62
See application file for complete search history.

(56) References Cited

U.S. PATENT DOCUMENTS

| 4,739,786 A | 4/1988 | Parkinson | |
|---|---|---|---|
| 2014/0238510 A1* | 8/2014 | Henry | B60K 15/03 137/544 |

FOREIGN PATENT DOCUMENTS

DE    10 2009 039 447 A1    3/2011

OTHER PUBLICATIONS

International Search Report and Written Opinion dated Sep. 14, 2016 in corresponding International Patent Application No. PCT/CA2016/050857.
International Preliminary Report on Patentability dated Jan. 23, 2018 in corresponding International Patent Application No. PCT/CA2016/050857.

* cited by examiner

*Primary Examiner* — Fritz M Fleming
(74) *Attorney, Agent, or Firm* — Medler Ferro Woodhouse & Mills PLLC

(57) ABSTRACT

Provided is a sensor wiper for a sensor pin used for fluid level detection. The sensor wiper comprises at least one swinging wiper having a wiper head for rotational association with a sensor pin, and an arcuate arm connected at a head end thereof to the wiper head. A plurality of inwardly directed radial elements are associated with the wiper head for engagement with the sensor pin. Sloshing action of fluids act upon the arcuate arm to move the wiping head, thereby causing the radial elements to engage and wipe the sensor pin.

11 Claims, 5 Drawing Sheets

WIPER FOR LIQUID LEVEL SENSORS IN AUTOMOTIVE WASHER BOTTLE

CROSS-REFERENCE TO RELATED APPLICATIONS

This application claims the benefit of U.S. Provisional Patent Application Ser. No. 62/195,064 filed 21 Jul. 2015, which is hereby incorporated by reference in its entirety for all purposes.

FIELD

The present disclosure relates to the field of automotive washer bottles, and in particular to a wiper for removing residue build-up on capacitance-type level sensors contained therein.

BACKGROUND

In automotive windscreen management systems, a variety of windshield washer fluids and additive are available. With some of these fluids and additives, it has been observed that residue build-up (i.e. silicone) on capacitance-type level sensors is occurring. Mechanisms ro address the residue build-up are required to ensure continued use and accurate operation of capacitance-type level sensors.

SUMMARY

According to an aspect of the disclosure, provided is a wiper for a sensor pin used for fluid level detection. The wiper comprising a wiper head for rotational association with a sensor pin, a plurality of inwardly directed radial fins associated with the wiper head for engagement with the sensor pin, and an arm connected to the wiper head. Upon sloshing action of fluids, forces placed upon the arm serve to move the wiper head, thereby causing the fins to wipe the sensor pin.

According to another aspect of the disclosure, provided is a sensor wiper for a sensor pin used for fluid level detection. The sensor wiper comprises at least one swinging wiper having a wiper head for rotational association with a sensor pin, and an arcuate arm connected at a head end thereof to the wiper head. A plurality of inwardly directed radial elements are associated with the wiper head for engagement with the sensor pin. Sloshing action of fluids act upon the arcuate arm to move the wiping head, thereby causing the radial elements to engage and wipe the sensor pin.

According to another aspect of the disclosure, provided is a sensor wiper for a sensor pin used for fluid level detection. The sensor wiper comprises a first paddle wiper having a first paddle head for rotational association with a first sensor pin, and a second paddle wiper having a second paddle head for rotational association with a second sensor pin. The first and second paddle wipers are each connected to a respective paddle arm. At least a portion of the first and second paddle heads are defined by a gear portion, the gear portion of each of the first and second paddle heads being configured to mechanically interlock through a partial rotation of the first and second paddle heads about the respective sensor pins from a first position A through to a second position B. A plurality of inwardly directed radial elements are associated with the first and second paddle heads for engagement with the respective sensor pin. Sloshing action of fluids act upon at least one of the paddle arms to move the paddle heads, thereby causing the radial elements to engage and wipe the sensor pins.

According to another aspect of the disclosure, provided is an automotive washer bottle. The automotive washer bottle comprises a primary holding tank, a fill tube for receiving washer fluid, an outlet for releasing washer fluid to an associated pumping system, and a level sensor having at least one sensor pin that extends into the primary holding tank. The automotive washer bottle also includes a sensor wiper operably associated with the at least one sensor pin of the level sensor. The sensor wiper comprises a swinging wiper having a wiper head for rotational association with the sensor pin, and an arcuate arm connected at a head end thereof to the wiper head. A plurality of inwardly directed radial elements are associated with the wiper head for engagement with the sensor pin. Sloshing action of fluids within the primary holding tank act upon the arcuate arm to move the wiping head, thereby causing the radial elements to engage and wipe the sensor pin.

BRIEF DESCRIPTION OF THE DRAWINGS

The foregoing and other features and advantages of the disclosure will be apparent from the following description of the disclosure as illustrated in the accompanying drawings. The accompanying drawings, which are incorporated herein and form a part of the specification, further serve to explain the principles of the disclosure and to enable a person skilled in the pertinent art to make and use the disclosure. The drawings are not to scale.

DETAILED DESCRIPTION

Specific embodiments of the present disclosure will now be described with reference to the Figures, wherein like reference numbers indicate identical or functionally similar elements. The following detailed description is merely exemplary in nature and is not intended to limit the disclosure or the application and uses of the disclosure. A person skilled in the relevant art will recognize that other configurations and arrangements can be used without departing from the scope of the disclosure. Although the description and drawings of the embodiments hereof exemplify the technology as applied to capacitive-type sensors in automotive washer bottle systems, the disclosure may be applied in other applications in which capacitive-type sensors are used and prone to residue build up. Furthermore, there is no intention to be bound by any expressed or implied theory presented in the preceding technical field, brief summary or the following detailed description.

Figure 1:
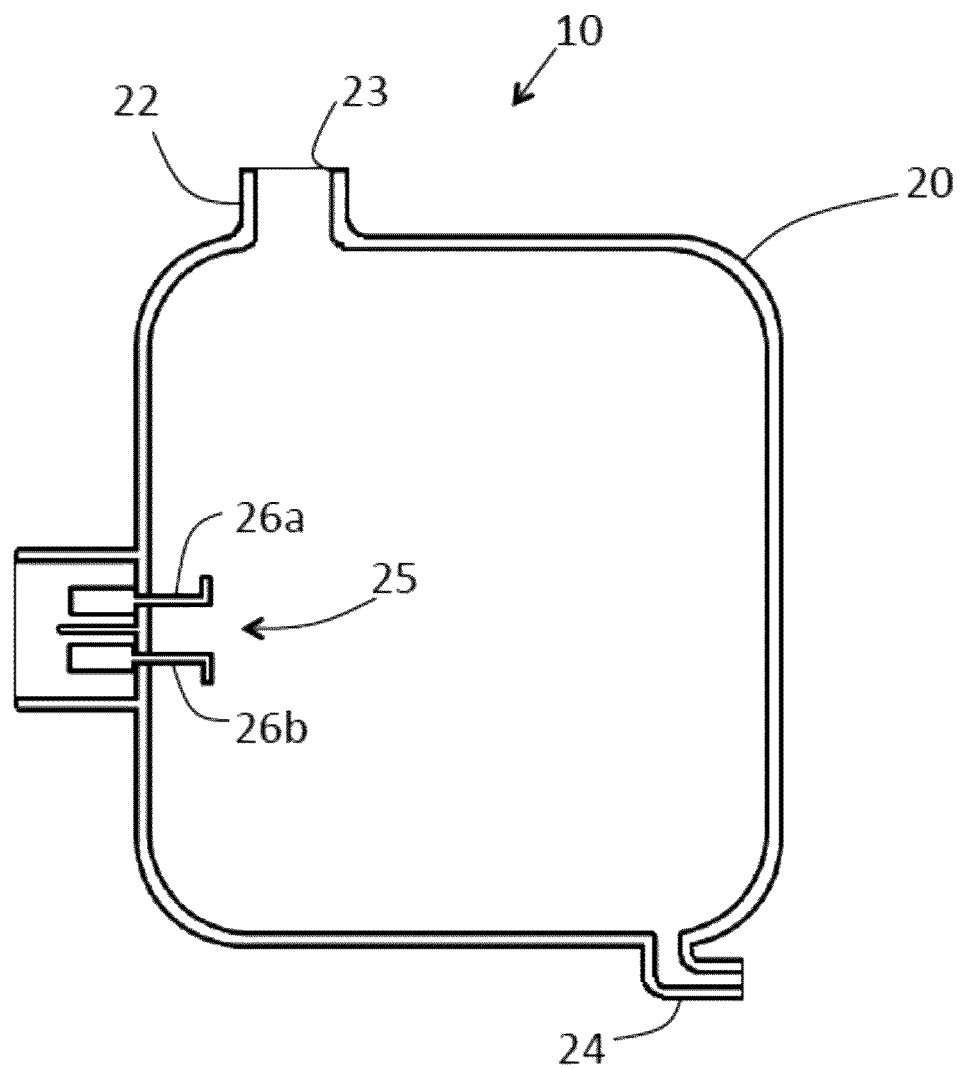
FIG. 1 is a schematic representation of an automotive washer bottle.

FIG. 1 presents a schematic representation of washer bottle 10 having a primary holding tank 20, a fill tube 22 for receiving washer fluid and an outlet 24 for releasing washer fluid to an associated pumping system (not shown) for delivery where required (i.e. the windshield). Washer bottle 10 is also provided with a capacitance-type level sensor 25 mounted on a sidewall portion of the primary holding tank 20, the level sensor 25 having a pair of sensor pins 26a, 26b that extend into the primary holding tank 20. The pair of sensor pins 26a, 26b cooperate to provide a low-level alert when the washer fluid reaches a predetermined level. It will be appreciated that washer bottle 10 may be configured in a range of shapes to fit the available spacing in the engine compartment. For example, fill tube 22 will generally be shaped so as to position a fill end 23 in a region of the engine compartment accessible to the vehicle operator.

Figure 2:
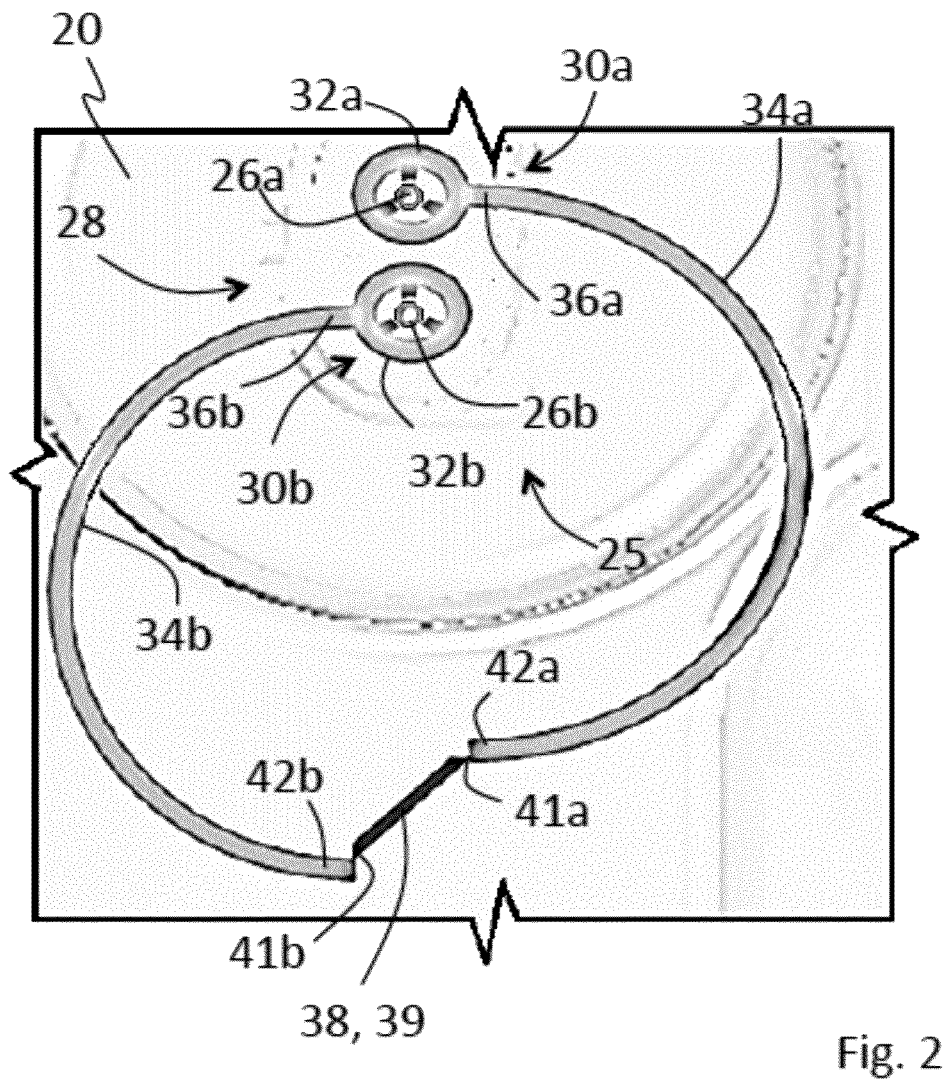
FIG. 2 presents a wiper for an automotive washer bottle capacitance-type sensor according to a first embodiment.
Figure 3:
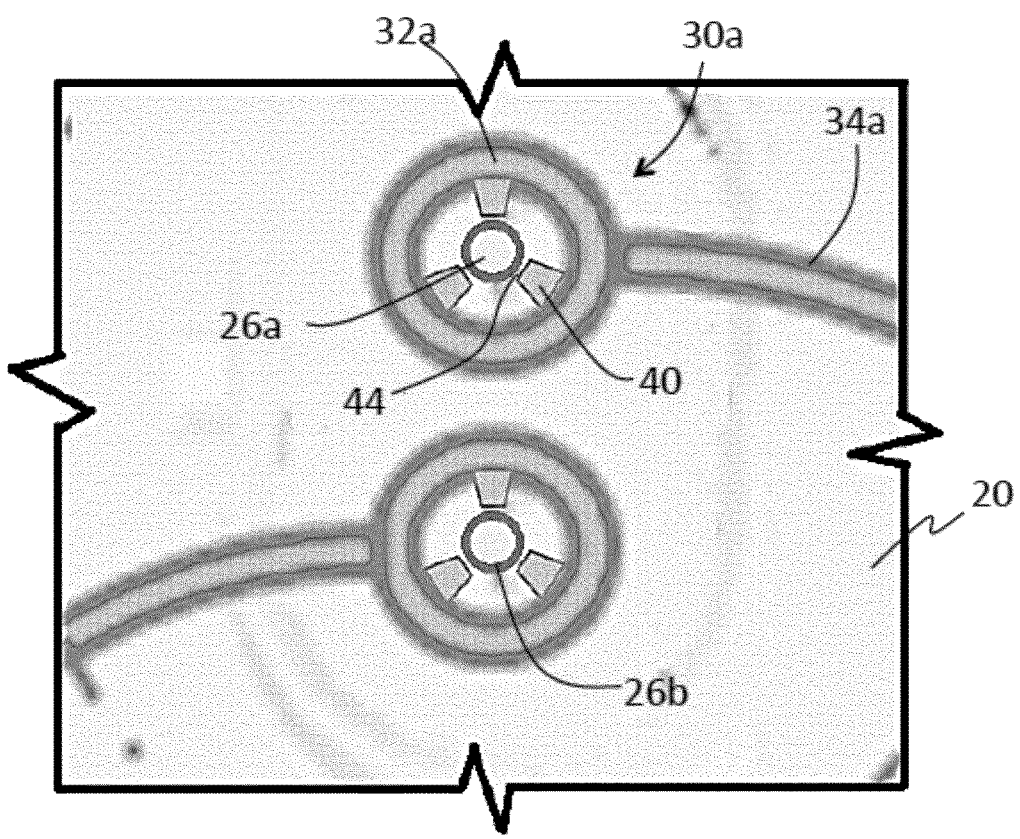
FIG. 3 presents a more detailed view of the embodiment of FIG. 2

Turning now to FIGS. 2 and 3, shown is a first embodiment of a sensor wiper 28 for use in washer bottle 10. As shown each sensor pin 26a, 26b is fitted with a respective swinging wiper which serves to wipe way residue from the sensor pins 26a, 26b. As shown, the sensor wiper 28 includes a first swinging wiper 30a having a first wiper head 32a rotatably mounted on the sensor pin 26a, and a second swinging wiper 30b having a second wiper head 32b rotatably mounted on the sensor pin 26b. The first wiper head 32a is connected to a first arcuate arm 34a at a first head end 36a. The second wiper head 32b is similarly connected to a second arcuate arm 34b at a second head end 36b. The first and second arcuate arms 34a, 34b (collectively arcuate arms 34) are interconnected by a wiper linkage 38 at respective first and second linkage ends 42a, 42b located opposite the first and second head ends 36a, 36b. As shown, the wiper linkage 38 is presented as a link member 39 that connects to the first and second linkage ends 42a, 42b at living hinges 41a, 41b. Accordingly, the first and second swinging wipers 30a, 30b (collectively swinging wiper 30) of the sensor wiper 28 operate as a single interconnected unit where movement upon at least one of the arcuate arms 34 results in partial rotational movement of the first and second wiper heads 32a, 32b (collectively wiper heads 32) about the respective sensor pins 26a, 26b.

Each wiper head 32 is provided with a plurality of inwardly directed radial elements 40 that engage the respective sensor pin 26a, 26b. As shown, the radial elements 40 are presented in the form of radial fins.

By virtue of the sloshing of washer fluid and its action upon at least one of the arcuate arms 34 of the swinging wiper 30, the interconnected arcuate arms 34, and in particular the wiper heads 32 undergo a partial rotational (i.e. swinging) action upon the respective sensor pin 26a, 26b. In the process of this partial rotational action upon sensor pins 26a, 26b, the inwardly directed radial elements 40 provided on each wiper head 32 engage and serve to wipe way residue from the sensor pins 26a, 26b. The process is self-actuating, based on sloshing motion of the fluid within washer bottle 10. The wiper linkage 38 interconnecting the pair of swinging wipers 30 assists in keeping the overall mechanism in motion.

Figure 4:
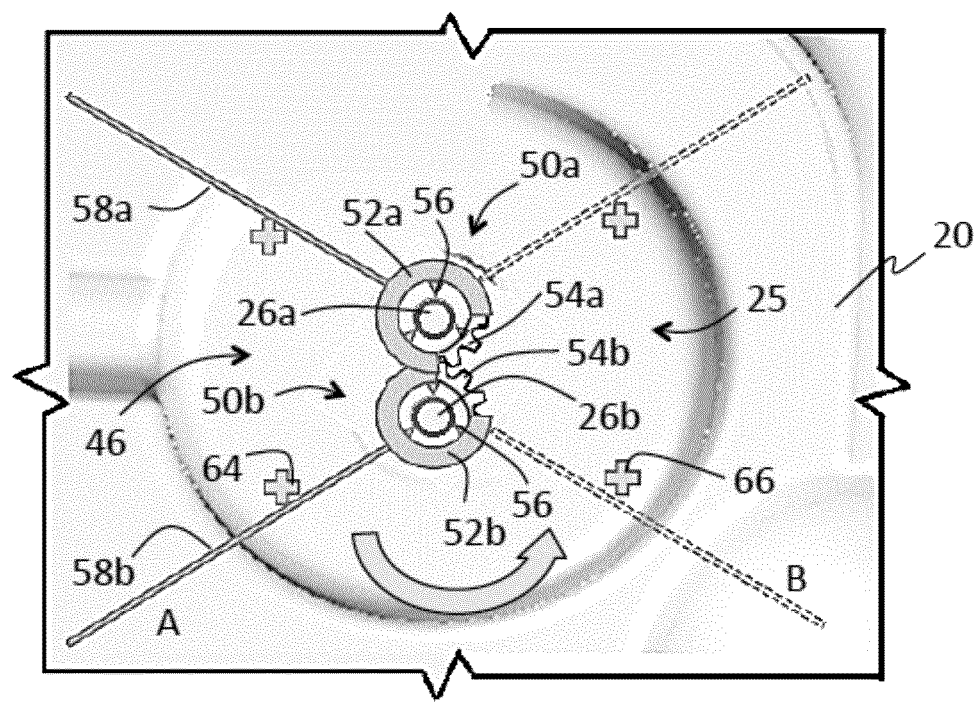
FIG. 4 presents an alternate embodiment of a wiper for an automotive washer bottle capacitance-type sensor.
Figure 5:
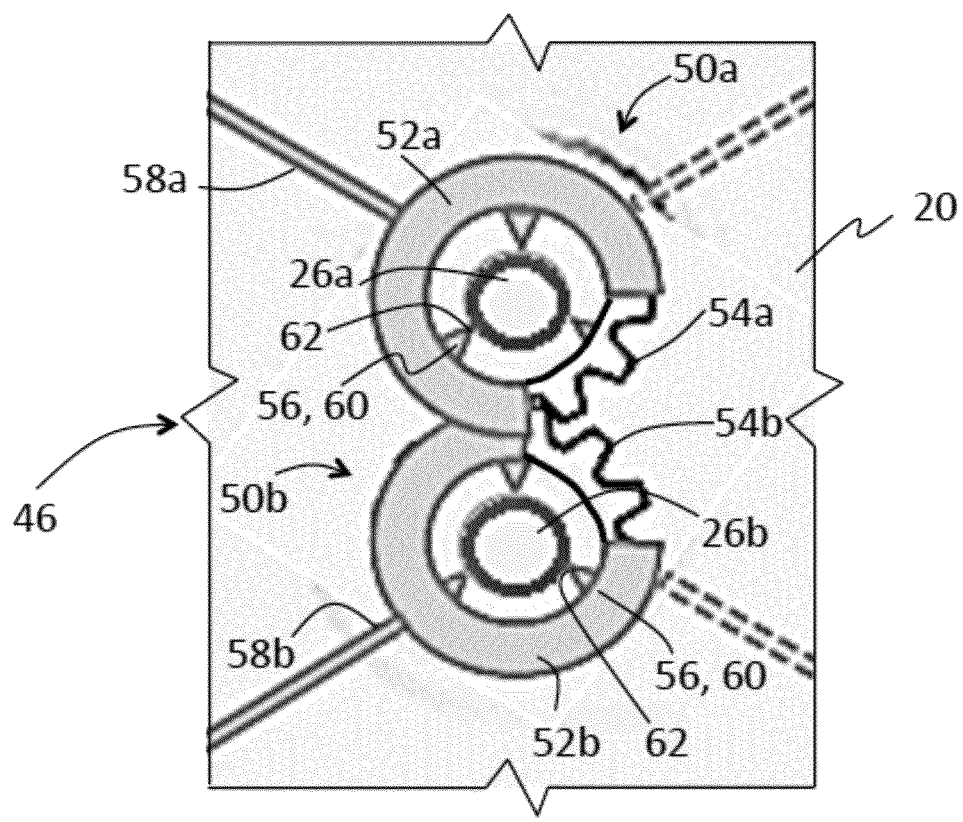
FIG. 5 presents a more detailed view of the embodiment of FIG. 4.

Presented in FIGS. 4 and 5 is an alternative embodiment of a sensor wiper 46. As shown, each sensor pin 26a, 26b, is fitted with a respective paddle wiper which serves to wipe away residue from the sensor pins 26a, 26b. The sensor wiper 46 includes a first paddle wiper 50a having a first paddle head 52a rotatably mounted on the sensor pin 26a, and a second paddle wiper 50b having a second paddle head 52b rotatably mounted on the sensor pin 26b. The first paddle head 52a is connected to a first paddle arm 58a. The second paddle head 52b is similarly connected to a second paddle arm 58b. The structure forming the first paddle head 52a is partially defined by a first gear portion 54a which is configured to mechanically interlock with a second gear portion 54b provided on second paddle head 52b. As such, partial rotational movement of one paddle head (i.e. first paddle head 52a) about the sensor pin causes the second paddle head (i.e. second paddle head 52b) to similarly rotate about the other sensor pin. The interlocking first and second gear portions 54a, 54b (collectively gear portions 54) interconnecting the first and second paddle wipers 50a, 50b (collectively paddle wipers 50) assists in keeping the overall sensor wiper 46 in motion.

Each of first and second paddle heads 52a, 52b (collectively paddle head 52) provide a plurality of inwardly directed radial elements 56 that engage the respective sensor pin 26a, 26b. As shown, the radial elements 56 are presented in the form of radial fins.

By virtue of sloshing of washer fluid and its action upon at least one of the first and second paddle arms 58a, 58b (collectively paddle arms 58), the paddle arms 58 transmit motion to respective paddle heads 52. With the arrangement of the gear portions 54 as shown, the paddle arms 58 are moveable through a range of positions defined between a first position A and a second position B (shown in dot with respect to second paddle arm 58b). The sensor wiper 46 may also provide a first position limit 64 and a second position limit 66 to further define the region between first position A and second position B. As the plurality of inwardly directed radial elements 56 are provided on each paddle head 52, each respective sensor pin 26a, 26b is wiped through the permitted range of motion, generally limited by interlocking gear portions 54. The process is self-actuating, based on sloshing motion of the fluid within washer bottle 10.

In the embodiments presented above, the radial elements 40, 56 are presented in the form of radial fins. In general, the radial elements may be provided in a variety of configurations. The radial fins shown in FIG. 3 are shaped to provide an engagement flat 44 that engages the respective sensor pin 26a, 26b. The engagement flat 44 may be planar, although other profiles may be implemented. For example, the engagement flat 44 may be shaped to generally follow the contours of the sensor pin 26a, 26b. In an alternative embodiment, the radial fins may be shaped to present an engagement ridge 60 that engages the respective sensor pin 26a, 26b along a narrower ridge-line 62. Although the wiper heads 32 and the paddle heads 52 are shown as having 3 radial elements positioned to engage the respective sensor pin, it will be appreciated that arrangements are possible where the wiper heads 32 and paddle heads 52 have fewer than 3, or more than 3 radial elements. As shown, the radial elements are dimensioned to engage the respective sensor pin. The engagement may be continuous, that is where the radial elements are sized such that each maintains continuous contact with the sensor pin. It will be appreciated that with a continuous engagement arrangement, the sizing of the radial elements will be selected so as to avoid excessive friction between the radial elements and the sensor pin, so as to avoid binding therebetween. The engagement may also be discontinuous, that is where the radial elements are sized such that a slight gap spacing is provided between the radial elements and the sensor pin. In this arrangement, at least one radial element is generally in direct contact with the sensor pin, and during the course of rotational motion, one or more of the other radial elements are moved into contact the sensor pin, therein causing the desired wiping action.

While a range of materials may be used to form the swinging and paddle wiper embodiments detailed above, a thermoplastic is preferred. The thermoplastic may additionally include a compatible filler having abrasive qualities to enhance the wiping function. For example, the wipers may be formed of polypropylene having a glass fiber content of 10 to 50%. In one particular embodiment, the wiper mechanism is formed of polypropylene having a 30% glass fiber content. In other embodiments, radial elements 40, 56 on each disclosed embodiment may be separately formed or otherwise provided with additional abrasive content to enhance the wiping action of pins 26a, 26b.

It will be appreciated that a variety of means may be implemented to retain the swinging or paddle wiper embodiments on the sensor pins. In one embodiment, each sensor pin is provided with a head or enlargement that is dimensionally larger than the openings provided in the central region of the swing/paddle heads 32, 52 on each respective construction. To facilitate mounting of the wipers of the sensor pins, the wiper or paddle head, as well as the respective radial elements 40, 56 may be provided with a degree of flexibility, enabling the wiper to be temporarily flexed and snapped into position on each respective sensor pin.

While the sensor wiper has been exemplified as having a pair of swinging wipers or paddle wipers that cooperative work to wipe the sensor pins 26a, 26b, in an alternative embodiment, the sensor wiper may be configured with only a single swinging wiper or paddle wiper, in particular where the level sensor is provided as a single-probe electrode.

While various embodiments according to the present disclosure have been described above, it should be understood that they have been presented by way of illustration and example only, and not limitation. It will be apparent to persons skilled in the relevant art that various changes in form and detail can be made therein without departing from the scope of the disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

The invention claimed is:

1. A sensor wiper for a sensor pin used for fluid level detection, the sensor wiper comprising:
   at least one swinging wiper having a wiper head for rotational association with a sensor pin, and an arcuate arm connected at a head end thereof to the wiper head; and
   a plurality of inwardly directed radial elements associated with the wiper head for engagement with the sensor pin,
   wherein sloshing action of fluids act upon the arcuate arm to move the wiper head, thereby causing the plurality of inwardly directed radial elements to engage and wipe the sensor pin.

2. The sensor wiper according to claim 1, wherein the at least one swinging wiper of the sensor wiper includes a first swinging wiper and a second swinging wiper, and wherein the first and second swinging wipers are interconnected by a wiper linkage at respective linkage ends located opposite the head ends of the respective arcuate arms.

3. The sensor wiper according to claim 1, wherein the plurality of inwardly directed radial elements is three radial elements provided on the wiper head.

4. The sensor wiper according to claim 1, wherein each of the plurality of inwardly directed radial elements is provided in the form of a radial fin having an engagement flat that engages the sensor pin.

5. The sensor wiper according to claim 1, wherein each of the plurality of inwardly directed radial elements is provided in the form of a radial fin having an engagement ridge that engages the sensor pin.

6. The sensor wiper according to claim 2, wherein the wiper linkage includes a link member that connects to respective linkage ends of the arcuate arms by way of respective living hinges.

7. A sensor wiper for a sensor pin used for fluid level detection, the sensor wiper comprising:
   a first paddle wiper having a first paddle head for rotational association with a first sensor pin;
   a second paddle wiper having a second paddle head for rotational association with a second sensor pin,
      the first and second paddle wipers being connected to first and second paddle arms, respectively,
      at least a portion of the first and second paddle heads being defined by a gear portion, the gear portion of each of the first and second paddle heads being configured to mechanically interlock through a partial rotation of the first and second paddle heads about the first and second sensor pins, respectively, from a first position A through to a second position B; and
   a plurality of inwardly directed radial elements associated with the first and second paddle heads for engagement with the first and second sensor pins, respectively,
   wherein sloshing action of fluids act upon at least one of the first and second paddle arms to move at least one of the first and second paddle heads, respectively, thereby causing the plurality of inwardly directed radial elements to engage and wipe the first and/or second sensor pins.

8. The sensor wiper according to claim 7, wherein the plurality of inwardly directed radial elements is three radial elements provided on the first and second paddle heads.

9. The sensor wiper according to claim 7, wherein each of the plurality of inwardly directed radial elements is provided in the form of a radial fin having an engagement flat that engages the respective first or second sensor pin.

10. The sensor wiper according to claim 7, wherein each of the plurality of inwardly directed radial elements is provided in the form of a radial fin having an engagement ridge that engages the respective first or second sensor pin.

11. An automotive washer bottle comprising:
   a primary holding tank;
   a fill tube for receiving washer fluid;
   an outlet for releasing washer fluid to an associated pumping system;
   a level sensor having at least one sensor pin that extends into the primary holding tank; and
   a sensor wiper operably associated with the at least one sensor pin of the level sensor, the sensor wiper comprising
      a swinging wiper having a wiper head for rotational association with the sensor pin, and an arcuate arm connected at a head end thereof to the wiper head, and
      a plurality of inwardly directed radial elements associated with the wiper head for engagement with the at least one sensor pin,
   wherein sloshing action of fluids within the primary holding tank act upon the arcuate arm to move the wiper head, thereby causing the plurality of inwardly directed radial elements to engage and wipe the at least one sensor pin.

* * * * *